United States Patent [19]

Maak et al.

[11] Patent Number: 4,541,869

[45] Date of Patent: Sep. 17, 1985

[54] PROCESS FOR FORMING FOUNDRY COMPONENTS

[75] Inventors: Norbert Maak; Wolfgang Friedemann, both of Neuss; Hans Fehr, Duesseldorf; Kurt Feulner, Essen, all of Fed. Rep. of Germany

[73] Assignee: Henkel Kommanditgesellschaft auf Aktien, Duesseldorf, Fed. Rep. of Germany

[21] Appl. No.: 523,827

[22] Filed: Aug. 15, 1983

Related U.S. Application Data

[63] Continuation-in-part of Ser. No. 381,101, May 24, 1982, abandoned.

[30] Foreign Application Priority Data

Jun. 4, 1981 [DE] Fed. Rep. of Germany ....... 3122244

[51] Int. Cl.$^4$ ................................................. B28B 7/34
[52] U.S. Cl. .................................. 106/38.35; 106/84; 164/16; 164/528
[58] Field of Search ................. 106/38.35, 84; 164/16, 164/528

[56] References Cited

U.S. PATENT DOCUMENTS

| | | | |
|---|---|---|---|
| 2,926,098 | 2/1960 | Ilenda et al. | 106/38.35 |
| 3,032,426 | 5/1962 | Lee | 106/84 |
| 4,329,177 | 5/1982 | George | 106/38.35 |

*Primary Examiner*—Lorenzo B. Hayes
*Attorney, Agent, or Firm*—Ernest G. Szoke; Henry E. Millson, Jr.; Mark A. Greenfield

[57] ABSTRACT

Aqueous alkali metal silicate bonding compositions having a molar ratio of $SiO_2:Me_2O$ of 2.4:1 to 3.4:1, wherein Me is sodium and/or potassium, a solids content of about 35 to 50 percent by weight, and containing triethanolamine. The bonding compositions can be mixed with fillers such as quartz sand and used for the manufacture of molded forms for the casting of metals.

10 Claims, No Drawings

PROCESS FOR FORMING FOUNDRY COMPONENTS

The present application is a continuation-in-part of application Ser. No. 381,101, filed May 24, 1982, now abandoned.

BACKGROUND OF THE INVENTION

Compositions of bonding materials based on aqueous alkali metal silicate solutions have been known for a long time, and are widely used. Such bonding material compositions can be used for the manufacture of mineral insulating materials, impregnating materials, coating materials, paints, and putty, as well as for bonding wood, paper, ceramics, and mineral materials. The known alkali metal silicate solutions, in particular sodium silicate solutions, will usually have a molar ratio of $SiO_2:Me_2O$ (Me=sodium and/or potassium) in a range of 2.0:1 to 3.4:1, and a solids content of 35 to 50 weight percent.

Such bonding materials can be used for the manufacture of molds for metal castings. The aqueous alkali metal silicate solutions, which preferably have a molar ratio of $SiO_2:Me_2O$ in the range of 2.0:1 to 2.9:1, are strengthened with a fine particle filler such as sand; and the resulting mixture is then formed into the desired shape, and strengthened with a suitable hardener. A good hardener for such purpose is carbon dioxide gas.

Disadvantages of such bonding material compositions, including the process used, are the reduced flowability of the mixture which may prevent a pore-free filling of complicated hollow shapes, and the reduced initial strength of the gas treated cores within the first hour which may result in difficulties in their transportation. Furthermore, the completed molds and cores are very hard to break after the metal has been cast. In order to improve the "knock-out" of the molds after casting, various carbohydrates such as sugar, molasses, starch or cellulose derivatives are added to the bonding materials. However, none of these additives have a salutory effect on the initial strength of the gas treated molds.

For example, German Patent Application DE-OS No. 27 50 294 discloses as bonding materials an aqueous solution containing alkali metal silicate and a carbohydrate from the group of glycanes, glycanoligosaccharides, and glycanitol derivatives of the oligosaccharides, the monosaccharides, and the disaccharides, and their derivatives, as well as an oxyanion of boron, tin, germanium, tellurium, or arsenic which can form a water-soluble complex with the carbohydrate.

In PCT Patent applications Nos. WO 80/01 767 and WO 80/01 768, compositions of bonding materials are described that are based on an aqueous alkali metal silicate solution containing water-soluble carbohydrates from the groups of mono-, di- and polysaccharides or their derivatives as well as urea (No. WO 80/01 767) and phenolic compounds, selected from the group of compounds with one, two, or three phenol groups, polynuclear hydrocarbons with phenol groups, and phenolic acids (No. WO 80/01 768).

The subject matter of German Patent Application DE-OS No. 28 56 267 relates to non-self-curing bonding materials to be used for the manufacture of foundry molds and cores, and available as aqueous solutions of alkali metal silicates with the addition of one or several anionic and/or nonionic surfactants. The latter additives enhance the flowability of the bonding materials.

U.S. Pat. No. 3,032,426 to R. S. Lee discloses the use of an ethanolamine, preferably diethanolamine, as a cure accelerator in a process for producing foundry cores and molds from alkali metal silicate-sand compositions. In the Lee process, an alkali metal silicate is mixed with sand and then an ethanolamine is added to the silicate-sand mixture. Curing is carried out with carbon dioxide.

DETAILED DESCRIPTION OF THE INVENTION

The present invention relates to bonding compositions particularly useful for the manufacture of foundry molds and cores used for casting metals using carbon dioxide as the hardener. The bonding compositions of the invention are novel aqueous alkali metal silicate solutions which, when freshly mixed with fillers such as sand, exhibit good flowability. Furthermore when the mold sections are removed from their casting after hardening, they exhibit an improved initial strength, a good final strength, and excellent knockdown properties after casting.

The present invention also relates to a process for forming foundry molds and cores.

The present bonding compositions are aqueous alkali metal silicate solutions having the following characteristics:

(a) a molar ratio of $SiO_2:Me_2O$ of from about 2.4:1 to about 3.4:1, preferably about 2.4:1 to about 2.9:1, where Me represents sodium and/or potassium, and a solids content of from about 35 to about 50 percent by weight, based on the weight of the alkali metal silicate solution; and (b) from about 0.1 percent by weight to the solubility limit in the aqueous alkali metal silicate solution, and usually from about 0.1 to about 2 percent by weight, of triethanolamine, based on the weight of the aqueous bonding composition.

In addition to the above ingredients, the following optional ingredients may also be added, either singly or in combination:

(c) a small quantity of a solubility enhancer such as cumene sulfonate, sorbitol, or glycol;

(d) a small quantity of an anionic and/or nonionic surfactant to increase the flowability of the sand mixture;

(e) a small quantity of a so called "knock-down enhancer", such as a carbohydrate, e.g. sugar, molasses, starch, or starch and cellulose derivatives; and (f) a small amount of a lithium silicate to enhance the water resistance of the molded parts.

The addition of the above optional ingredients can be carried out using ingredients and quantities thereof already known to the art for use with aqueous alkali metal silicate bonding compositions.

The process of the invention for forming foundry molds and cores is carried out by the following sequence of steps:

1. forming an aqueous alkali metal silicate bonding composition by mixing together A. an aqueous alkali metal silicate solution wherein the alkali metal silicate has a molar ratio of $SiO_2:Me_2O$ of from about 2.4:1 to about 3.4:1, preferably about 2.4:1 to about 2.9:1, where Me represents sodium and/or potassium, and the solution has a solids content of from about 35 to about 50 percent by weight, based on the weight of the solution, B. from about 0.1 percent by weight to the solubility limit in the aqueous alkali metal slicate solution in A., and usually from about 0.1 to about 2 percent by weight, of triethanolamine, based on the weight of the aqueous alkali metal silicate bonding composition, and C. optional ingredients set forth above, if desired;

2. mixing together from about 3 to about 6 weight percent of the aqueous alkali metal silicate bonding composition of step 1. above with from about 97 to about 94 weight percent of a finely-divided filler material usually quartz sand;

3. shaping the mixture from step 2. into a foundry mold or core; and 4. curing the resulting mold or core, generally by the use of carbon dioxide gas.

In the above process, the first step thereof need not be carried out immediately prior to the second step, i.e. the aqueous alkali metal silicate bonding composition of the invention can be formulated earlier and then stored until ready for use in the formation of the foundry molds and cores.

It was found that the addition of triethanolamine to aqueous alkali metal silicate solutions to form the bonding compositions of the invention not only gives the subsequently formed bonding composition/filler mixture used to form the molds a good flowability prior to hardening and good knock-down properties of the molds after casting, but also improves considerably the initial strength of the hardened molds. It is understood that the term "initial strength" means the compression strength of the gas treated molds after the first hour of hardening. Even after relatively short hardening times of the molds after carbon dioxide treatment, excellent initial compression strength results, making it easier to transport the hardened molds. The excellent flowability of the bonding composition/filler mixtures when using the present bonding composition results in complete pore-free filling or even complicated hollow shapes without any technical problems. In addition, as stated earlier, molds using the present bonding compositions exhibit good knock-down qualities after casting.

Surprisingly, when the process of the invention is varied by either first mixing the aqueous alkali metal silicate-solution with the sand, followed by the addition of triethanolamine, which is the process used in the Lee patent (U.S. Pat. No. 3,032,426), or by first mixing together the triethanolamine and the sand followed by the addition of the aqueous alkali metal silicate solution, with subsequent $CO_2$ curing, the initial strength of the resulting cores is significantly less than the core produced in accordance with the process of the invention.

Furthermore, the effect of the addition of triethanolamine to aqueous alkali metal silicate solutions in the process of the invention was not anticipated because the addition of monoethanolamine or diethanolamine thereto gave unsatisfactory results. In contrast, the addition of triethanolamine was effective, even in amounts as low as 0.1 wt %, in relation to the weight of the total aqueous bonding composition.

Furthermore, molds made from the bonding composition/filler mixtures of the invention exhibit decreased hygroscopy as well as good edge strength compared to prior art molds.

The alkali metal silicate solutions utilized in the present novel compositions are usually waterglass solutions, such as sodium silicate solutions and/or potassium silicate solutions, having a molar ratio within the range given above. Aqueous alkali metal silicate solutions can also be obtained by dissolving in water, water-soluble alkali metal silicates in powder form. Preferred for use in the practice of the invention are sodium/potassium mixed glasses, i.e. sodium silicate/potassium silicate solutions.

As already discussed above, the present bonding compositions can be used in the process of the invention for the manufacture of molded parts, especially for molds and/or cores for metal casting, by mixing them with finely divided filler materials, preferably quartz sand, followed by the use of carbon dioxide as the hardener. The manufacture of such molds is otherwise carried out in a known manner.

The bonding composition of the invention can also be used for other purposes where water-based alkali metal silicate solutions are normally used.

The invention will be more clearly understood from the following examples which are given for illustration purposes only and not to limit the invention.

EXAMPLE 1

An aqueous alkali metal silicate bonding composition was formed by mixing together 90 wt % of a sodium silicate solution having a molar ratio of $SiO_2:Na_2O$ of 2.57:1 and a solids content of 41.65 wt %; 5 wt % of a 20% by weight aqueous solution of triethanolamine and 5 wt % of deionized water.

40 parts by weight of the above bonding composition were vigorously mixed for two minutes with 1,000 parts by weight of quartz sand (grain size F 32). 170 g of the resulting mixture was shaped into cylindrical cores using compacting equipment obtained from the Georg Fischer Co. (Georg Fischer A-G, Schaffhausen, Switzerland). The cylindrical cores were made 60 mm high, with a 50 mm diameter; they were formed and compacted by 3 ramming strokes. The obtained cores were then hardened by gassing them with carbon dioxide (28 l/minute for 5 seconds at 25° C., and 1.5 bar line pressure).

The resistance to compression of the molded parts after storing them for 1 hour at room temperature (initial strength) is determined by using equipment to measure resistance to compression (Georg Fischer equipment, manufactured by the Geog Fischer A-G, Schaffhausen, Switzerland).

The results are tabulated in the TABLE given below.

In order to determine flowability, 170 g of the freshly prepared sand/bonding composition mixture were transferred into a flowability measuring device, type PFB (manufactured by the Georg Fischer A-G, Schaffhausen, Switzerland) and weighed; the mixture was then placed into the compacting equipment, and compacted with 3 ramming strokes. The resulting measurement was shown on the ramming shaft, and the flowability F was determined using the following equation:

$$F\% = 6.66 \times (60 \text{ less the observed value}).$$

Normally, a quantitative determination of the break-apart properties ("knock-out" properties) of the molded parts cannot be achieved under laboratory conditions because the tempered cores fall apart when touched or when trying to transport them to the compression testing equipment. Therefore, they were tested by the following test procedure:

The molded parts which were obtained under the above described conditions were stored for 72 hours at room temperature and 50% relative air humidity. They were then tempered at 720° C. or 900° C. for 2 minutes, and then tested in the Georg Fischer compression testing equipment. The results obtained are also listed in the TABLE I given below.

The results of the following Examples 2–4 and COMPARISON EXAMPLES 1 and 2, unless otherwise indicated, were obtained following the same experimental and testing procedures given above, i.e. the aqueous bonding compositions of each example was mixed with quartz sand shaped into cores and hardened according to the procedure given in EXAMPLE 1 above using the same quantities of ingredients used in EXAMPLE 1. The cores were then tested according to the procedures given in EXAMPLE 1. The results obtained are given in TABLE I below.

EXAMPLE 2

90 wt % of the sodium silicate solution of EXAMPLE 1 was mixed with 0.5 wt % of a 20 wt % aqueous solution of triethanolamine and 9.5% deionized water.

EXAMPLE 3

90 wt % of a sodium silicate solution in a molar ratio of $SiO_2:Na_2O$ of 2.47:1, and a solids content of 47.3 wt %, was mixed with 10 wt % of a 20 wt % aqueous triethanolamine solution.

EXAMPLE 4

90 wt % of an alkali metal silicate solution consisting of 80 wt % of a sodium slicate solution with a molar ratio of $SiO_2:Na_2O$ of 2.47:1, and a solids content of 47.3 wt % plus 20 wt % of a potassium silicate solution having a molar ratio of $SiO_2:K_2O$ of 2.88:1, and a solids content of 41.1 wt %, was mixed with 10 wt % of a 20 wt % aqueous triethanolamine solution.

COMPARISON EXAMPLE 1

In contrast to the above examples used to illustrate this invention, this comparison example contains diethanolamine. 90 wt % of a sodium silicate solution having a molar ratio of $SiO_2:Na_2O$ or 2.47:1, and a solids content of 47.2 wt % was mixed with 10 wt % of a 30 wt % aqueous diethanolamine solution.

COMPARISON EXAMPLE 2

The bonding composition of this example is free of any ethanolamine. 90 wt % of a sodium silicate solution having a molar ratio of $SiO_2:Na_2O$ of 2.47:1, and a solids content of 47.3 wt % was mixed with 10 wt % deionized water.

The results obtained from the above examples with respect to flowability, initial strength, and break-apart properties ("knock-out" properties) of the molded parts after casting, are given in the following TABLE I:

TABLE I

| EXAMPLE | Flow-ability (%) | Resistance to Compression after one hour (bar) | Break Apart Properties after 72 hours | |
|---|---|---|---|---|
| | | | at 720° C. | at 900° C. |
| 1 | 31.3 | 11.08 | good | good |
| 2 | 33.74 | 8.33 | satisfactory | satisfactory |
| 3 | 32.41 | 10.53 | very good | very good |
| 4 | 41.63 | 14.5 | good | good |
| Comparison 1 | 24.98 | 7.0 | insufficient | insufficient |
| Comparison 2 | 27.53 | 6.03 | insufficient | insufficient |

Evaluation of the break-apart properties
"Very good": The molded parts break apart when touched.
"Good": The molded parts are easily crushed by hand.
"Satisfactory": The molded parts break apart with very light pressure.
"Insufficient": The molded parts break apart when increased pressure is applied.

EXAMPLE 5

Four compositions were prepared according to the procedure given below for each composition. The ingredients referred to in the procedures are as follows:
quartz sand = quartz sand F 32
water glass = sodium water glass having a molar ratio $SiO_2/Na_2O$ of 2.48:1 and a solids content of 47 wt %.
TEA (20%) = triethanolamine in 20% aqueous solution.

The total mixing time for each composition was 2 minutes.

Composition 1

1 kg quartz sand + 40 g water glass
mixing time: 2 minutes

Composition 2

1 kg quartz sand + 36.4 g water glass
mixing time: 1 minute
then 3.6 g TEA (20%) was added
mixing time: 1 minute

Composition 3

1 kg quartz sand + 3.6 g TEA (20%)
mixing time: 1 minute
then 36.4 water glass was added
mixing time: 1 minute

Composition 4

1 kg quartz sand + 40 g. of the bonding composition of the invention composed of 36.4 g. water glass + 3.6 g. TEA (20%). Mixing time: 2 minutes

Production of Cores

One hundred seventy grams (170 g) of each of the above Compositions were placed into a core box and compacted by three ram impacts with the Georg Fischer ram apparatus. The resulting cores were then hardened with $CO_2$ gasification; gas pressure: 1.5 bar, time: 5 sec.

Compressive Strength Determinations

After the gasified cores had been stored for 1 min at room temperature, the compressive strength determination was performed in the Georg Fischer compressive strength test apparatus. The results obtained are given in Table II below.

TABLE II

| Composition | Initial strength in bar, after 1 min storage at room temperature, average of 6 individual determinations |
|---|---|
| 1 | 1.70 (comparison experiment without TEA) |
| 2 | 3.95 |
| 3 | 3.93 |

TABLE II-continued

| Composition | Initial strength in bar, after 1 min storage at room temperature, average of 6 individual determinations |
|---|---|
| 4 | 5.19 (in accordance with the invention) |

As can be seen from Table II above, cores prepared according to the process of the invention using the bonding composition of the invention (Composition 4) showed a markedly greater compressive strength than cores prepared by either first mixing the quartz sand and the water glass (Composition 2) or by first mixing the quartz sand and the TEA (Composition 3).

What is claimed is:

1. A process for forming a foundry core or mold component comprising the steps of
(I) forming a mixture of
  (a) from about 3 to about 6 percent by weight of a pre-formed aqueous bonding solution comprising
    (A) an alkali metal silicate solution having a molar ratio of $SiO_2:Me_2O$ of from about 2.4:1 to about 3.4:1, wherein Me represents sodium and/or potassium and a solids content of from about 35 to about 50% by weight, based on the weight of the alkali metal silicate solution; and
    (B) from about 0.1% by weight to the solubility limit in the aqueous alkali metal silicate solution of triethanolamine; and
  (b) from about 94 to about 97 percent by weight of a finely divided filler material;
(II) shaping the mixture formed in (I) into the shape of a core or mold component; and
(III) curing the shaped mixture.

2. A process in accordance with claim 1 wherein the shaped mixture is hardened in step (III) by the use of carbon dioxide.

3. A process in accordance with claim 1 wherein the molar ratio of $SiO_2:Me_2O$ in step I(a) is from about 2.4:1 to about 2.9:1.

4. A process in accordance with claim 1 wherein in step I(a) (B) from about 0.1% to about 2% by weight of triethanolamine is present.

5. A process in accordance with claim 1 wherein Me in step I(a) (A) represents a mixture of sodium and potassium.

6. A process in accordance with claim 1 wherein at least one of the following ingredients is also present in the mixture in step (I):
  (i) a solubility enhancer;
  (ii) an anionic surfactant;
  (iii) a nonionic surfactant;
  (iv) a carbohydrate; and
  (v) a lithium silicate.

7. A process for forming a foundry core or mold component comprising the steps of
1. forming an aqueous alkali metal silicate bonding composition by mixing together
  (i) an aqueous alkali metal silicate solution wherein the alkali metal silicate has a molar ratio of $SiO_2:Me_2O$ of from about 2.4:1 to about 3.4:1 wherein Me represents sodium and/or potassium, and the solution has a solids content of from about 35 to about 50 percent by weight, based on the weight of the solution,
  (ii) from about 0.1 percent by weight to the solubility in the aqueous alkali metal silicate solution in (i) of triethanolamine, based on the weight of the aqueous alkali metal silicate bonding composition, and optionally,
  (iii) one or more of the following ingredients a solubility enhancer; an anionic surfactant; a nonionic surfactant; a carbohydrate; and a lithium silicate;
2. mixing from about 3 to about 6 percent by weight of the aqueous alkali metal silicate bonding composition formed in Step (1.) above with from about 97 to about 94 percent by weight of a finely divided filler material;
3. shaping the mixture formed in Step (2.) above into a foundry core or mold; and
4. curing the shaped mixture.

8. A process in accordance with claim 7 wherein the shaped mixture in Step (4.) is cured with carbon dioxide.

9. A foundry core or mold prepared by the process of claim 1.

10. A foundry core or mold prepared by the process of claim 7.

* * * * *